United States Patent
Hanaoka et al.

(10) Patent No.: US 11,461,921 B2
(45) Date of Patent: Oct. 4, 2022

(54) PROGRAM, SYSTEM, ELECTRONIC DEVICE, AND METHOD FOR RECOGNIZING THREE-DIMENSIONAL OBJECT

(71) Applicant: CYGAMES, INC., Tokyo (JP)

(72) Inventors: Hiroki Hanaoka, Tokyo (JP); Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 286 days.

(21) Appl. No.: 16/905,084

(22) Filed: Jun. 18, 2020

(65) Prior Publication Data
US 2020/0320733 A1    Oct. 8, 2020

Related U.S. Application Data

(63) Continuation of application No. PCT/JP2018/045717, filed on Dec. 12, 2018.

(30) Foreign Application Priority Data

Dec. 21, 2017 (JP) ............................. JP2017-244891

(51) Int. Cl.
*G06T 7/70* (2017.01)
*G06F 16/21* (2019.01)
(Continued)

(52) U.S. Cl.
CPC .............. *G06T 7/70* (2017.01); *G06F 16/219* (2019.01); *G06F 16/2365* (2019.01);
(Continued)

(58) Field of Classification Search
CPC ....... G06T 2207/10016; G06T 2210/36; G06T 19/00; G06T 2207/10028;
(Continued)

(56) References Cited

U.S. PATENT DOCUMENTS 11,282,133 B2 * 3/2022 Greenberger ...... G02B 27/0172
2004/0085443 A1 * 5/2004 Kallioniemi ......... G06V 20/693
348/135
(Continued)

FOREIGN PATENT DOCUMENTS

JP          6368421 B1 *  8/2018  ............. G01B 11/00

OTHER PUBLICATIONS

Forgery and Tamper-Proof Identification Document—1993 (Year: 1993).*

(Continued)

*Primary Examiner* — Nizar N Sivji
(74) *Attorney, Agent, or Firm* — Osha Bergman Watanabe & Burton LLP

(57) ABSTRACT

The present invention provides a program that makes it possible to recognize a three-dimensional shape from a single image.
The present invention is a program for recognizing a three-dimensional object present in a real space and constituted of a plurality of predefined components. The program is executed by an electronic device provided with an image capture device for capturing an image of the three-dimensional object. The program causes the electronic device to execute an image recognition step, a query generation step, a data retrieving step, a component arrangement step, a consistency determination step, and in the case where it is determined that there is consistency, a three-dimensional object recognition step, and in the case where it is determined that there is no consistency, a database storage step, a query regeneration determination step, and a query regeneration step.

19 Claims, 7 Drawing Sheets

(51) Int. Cl.
  *G06F 16/2455* (2019.01)
  *G06F 16/23* (2019.01)
  *G06F 16/532* (2019.01)
  *G06V 20/20* (2022.01)

(52) U.S. Cl.
  CPC ...... *G06F 16/24565* (2019.01); *G06F 16/532* (2019.01); *G06V 20/20* (2022.01)

(58) Field of Classification Search
  CPC ........... G06T 2207/20081; G06T 17/00; G06T 19/20; G06T 2207/20021; G06T 7/70; G06T 2207/30204; G06T 7/50; G06T 7/73; G06T 7/60; G06F 16/33; G06F 16/116; G06F 16/51; G06F 16/532; G06F 16/219; G06F 16/2365; G06F 16/24565; G06V 10/40; G06V 20/40; G06V 20/64; G06V 20/20; G01B 11/2433; G01B 11/08; G01B 11/03; G01B 11/00
  See application file for complete search history.

(56) References Cited

U.S. PATENT DOCUMENTS

| | | | |
|---|---|---|---|
| 2013/0188864 A1* | 7/2013 | Moraleda | G06V 10/20 382/164 |
| 2022/0084296 A1* | 3/2022 | Sadalgi | G06T 19/006 |
| 2022/0088475 A1* | 3/2022 | Sekine | A63F 13/45 |

OTHER PUBLICATIONS

Pollefeys, M. et al.; "Visual modeling with a hand-held camera"; International Journal of Computer Vision, Chapel Hill, North Carolina, 2004 (52 pages).

Kemelmacher-Shlizerman, I. et al.; "3D Face Reconstruction from a Single Image using a Single Reference Face Shape"; IEEE Transactions on Pattern Analysis and Machine Intelligence, 2011 (14 pages).

International Search Report issued in the counterpart Japanese Patent Application No. PCT/JP2018/045717, dated Mar. 12, 2019 (5 pages).

Written Opinion issued in the counterpart Japanese Patent Application No. PCT/JP2018/045717, dated Mar. 12, 2019 (9 pages).

* cited by examiner

PROGRAM, SYSTEM, ELECTRONIC DEVICE, AND METHOD FOR RECOGNIZING THREE-DIMENSIONAL OBJECT

TECHNICAL FIELD

The present invention relates to a program, a system, an electronic device, and a method for recognizing a three-dimensional object, and particularly relates to a program, a system, an electronic device, and a method for recognizing a three-dimensional object present in a real space and constituted of a plurality of predefined components.

BACKGROUND ART

There are known technologies for recognizing the three-dimensional shape of a three-dimensional object in a real space from a captured plane image. However, when a three-dimensional shape is projected on a plane, three-dimensional information, such as depth and hidden surfaces, is lost, and thus, it is not possible to recognize the three-dimensional shape directly from a single plane image. Conventionally, a technology for recognizing a shape by inductively estimating three-dimensional information by associating a plurality of images captured from different viewpoints with each other, and a technology for recognizing a shape by deductively estimating the three-dimensional information of a specific target structure from previous knowledge about the structure have been developed.

For example, Non-Patent Literature 1 describes a technology for recognizing a shape by using a technology called Structure from Motion (SfM) to associate a plurality of images with each other. In addition, for example, Non-Patent Literature 2 describes a technology for recognizing a shape by using a single image as an input and assuming a specific target such as a human body or a facial expression. This technology pays attention to the fact that human facial expressions are globally similar but have many differences locally, and constructs a 3D model corresponding to an input image by deforming an existing 3D model.

CITATION LIST

Non-Patent Literature

{NPL 1}
Marc Pollefeys, Luc Van Gool, Maarten Vergauwen, Frank Verbiest, Kurt Cornelis, Jan Tops, Reinhard Koch. 2004. Visual Modeling with a Hand-Held Camera. International Journal of Computer Vision.
{NPL 2}
Ira Kemelmacher-Shlizerman, Ronen Basri. 2011. 3D face reconstruction from a single image using a single reference face shape. IEEE TRANSACTIONS ON PATTERN ANALYSIS AND MACHINE INTELLIGENCE.

SUMMARY OF INVENTION

Technical Problem

However, the technology described in Non-Patent Literature 1 requires a user to capture an image a plurality of times or to perform image capturing by using a plurality of cameras, and thus, the user operations become complex. In addition, because the technology described in Non-Patent Literature 2 assumes that a structure is known, the technology cannot be applied to the recognition of a structure freely formed by a user. As described above, no effective technology for recognizing the three-dimensional shape of a free-shape structure from a single plane image has been established.

The present invention has been made in order to solve this problem, and it is an object thereof to provide a program, etc. that makes it possible to recognize a three-dimensional shape from a single image.

Solution to Problem

In order to achieve the above object, a program according to an aspect of the present invention is a program for recognizing a three-dimensional object present in a real space and constituted of a plurality of predefined components, the program being executed by an electronic device provided with an image capture device for capturing an image of the three-dimensional object, the program being characterized by causing the electronic device to execute: an image recognition step for individually extracting, from an image captured by the image capture device, features that allow the individual components to be identified, and retrieving the IDs of the individual components and the position data of the components on the basis of the features; a query generation step for generating a query including the IDs of the individual components retrieved on the basis of the features; a data retrieving step for retrieving, in the case where a query is generated, by using the query, the three-dimensional models and constraint data of the individual components associated with the individual IDs included in the query, from a component database that stores, in association with each other, the IDs of the individual components, the three-dimensional models of the individual components, and constraint data indicating joining constraint conditions between the individual components; a component arrangement step for arranging the individual components in a virtual space corresponding to the real space on the basis of the position data, three-dimensional models, and constraint data retrieved for the individual components; a consistency determination step for determining the consistency of the positions of the individual arranged components on the basis of the positional relationship between the individual arranged components; in the case where it is determined that there is consistency, a three-dimensional object recognition step for recognizing the three-dimensional object on the basis of the positions of the individual arranged components; and in the case where it is determined that there is no consistency, a database storage step for storing, in a history database, query data for storage including at least the IDs of the individual components in the query used in the data retrieving step, a query regeneration determination step for determining whether or not to regenerate a query on the basis of the query data for storage stored in the history database and the data stored in the component database, and a query regeneration step for generating, in the case where it is determined to regenerate a query, a query including data different from the query data for storage stored in the history database.

In addition, in the present invention, preferably, the program causes the electronic device to execute a database initialization step for deleting, before the image recognition step, the query data for storage stored in the history database.

In addition, in the present invention, preferably, the component arrangement step arranges the individual components in the virtual space by using the position data and three-dimensional models retrieved for the individual components, and, for individual components adjacent to each other in the virtual space, aligns and arranges the individual components so as to satisfy the joining constraint conditions.

In addition, in the present invention, preferably, on the basis of whether or not the distance between the three-dimensional models of two components among the components arranged in the virtual space is within a prescribed value, the component arrangement step determines whether or not the two components are adjacent to each other.

In addition, in the present invention, preferably, the position is a six degrees of freedom position.

In addition, in the present invention, preferably, the features that allow the individual components to be identified are AR markers that the individual components have on the surfaces of the components.

In addition, in the present invention, preferably, when a query is generated, the data retrieving step uses the query to retrieve, from the component database, the three-dimensional models and constraint data of the individual components associated with individual IDs included in the query, by respectively adding the three-dimensional models and constraint data to the query in association with the IDs.

In addition, in the present invention, preferably, the consistency determination step determines the consistency of the positions of the individual arranged components on the basis of the degree of overlapping among areas occupied by the three-dimensional models of the individual arranged components.

In addition, in the present invention, preferably, the image recognition step recognizes a base part forming the base portion of the three-dimensional object from the image captured by the image capture device, the component arrangement step arranges the base part in the virtual space, and the consistency determination step determines whether or not the individual arranged components are arranged in conformance with gravity on the basis of the positional relationship between the positions of the individual arranged components and the position of the base part, and determines consistency further on the basis of the determination.

In addition, in the present invention, preferably, the consistency determination step determines consistency on the basis of the degree of matching between the image captured by the image capture device and an image of the individual arranged components viewed from a virtual camera arranged at a position in the virtual space corresponding to the position of the image capture device.

In addition, in the present invention, preferably, the database storage step further stores, in the history database, in association with the IDs of individual components included in the query data for storage, the positions of the individual arranged components.

In addition, in the present invention, preferably, the query regeneration determination step determines whether or not to regenerate a query on the basis of whether or not the query data for storage stored in the history database includes a prescribed combination of the IDs of components stored in the component database.

In addition, in the present invention, preferably, the program further causes the electronic device to execute an error output step for outputting an error in the case where it is determined not to regenerate a query.

In addition, in the present invention, preferably, the database storage step further stores, in the history database, in association with the IDs of individual components included in the query data for storage, a consistency evaluation value for the positions of the individual arranged components.

In addition, in the present invention, preferably, the program causes the electronic device to execute a second three-dimensional object recognition step for recognizing a three-dimensional object on the basis of the positions of the individual arranged components having the highest consistency based on the evaluation value, in the case where it is determined not to regenerate a query.

In addition, in the present invention, preferably, the query regeneration step generates a query to which, in the case where the distance between the three-dimensional models of two components among the components arranged in the virtual space is equal to or more than a prescribed value, the ID of a component corresponding to the distance is added.

In addition, in order to achieve the above object, a three-dimensional object recognition system according to an aspect of the present invention is a three-dimensional object recognition system for recognizing a three-dimensional object present in a real space and constituted of a plurality of predefined components, the three-dimensional object recognition system being characterized by including: an electronic device provided with an image capture device for capturing an image of the three-dimensional object; a component database that stores, in association with each other, the IDs of the individual components, the three-dimensional models of the individual components, and constraint data indicating joining constraint conditions between the individual components; a history database that stores query data for storage including at least the IDs of the individual components in a query input to the component database; an image recognition unit that individually extracts, from an image captured by the image capture device, features that allow the individual components to be identified, and retrieves the IDs of the individual components and the position data of the components on the basis of the features; a query generation unit that generates a query including the IDs of the individual components retrieved on the basis of the features; a data retrieving unit that retrieves, in the case where a query is generated, by using the query, the three-dimensional models and constraint data of the individual components associated with the individual IDs included in the query, from the component database; a component arrangement unit that arranges the individual components in a virtual space corresponding to the real space on the basis of the position data, three-dimensional models, and constraint data retrieved for the individual components; a consistency determination unit that determines the consistency of the positions of the individual arranged components on the basis of the positional relationship between the individual arranged components; a three-dimensional object recognition unit that, in the case where it is determined that there is consistency, recognizes the three-dimensional object on the basis of the positions of the individual arranged components; and in the case where it is determined that there is no consistency, a database storage unit that stores, in the history database, query data for storage including at least the IDs of the individual components in the query used by the data retrieving unit; a query regeneration determination unit that determines whether or not to regenerate a query on the basis of the query data for storage stored in the history database and the data stored in the component database; and a query regeneration unit that generates, in the case where it is determined to regenerate a query, a query including data different from the query data for storage stored in the history database.

In addition, in order to achieve the above object, an electronic device according to an aspect of the present invention is an electronic device for recognizing a three-dimensional object present in a real space and constituted of a plurality of predefined components, the electronic device being characterized by including: an image capture device for capturing an image of the three-dimensional object; a component database that stores, in association with each other, the IDs of the individual components, the three-dimensional models of the individual components, and constraint data indicating joining constraint conditions between the individual components; a history database that stores query data for storage including at least the IDs of the individual components in a query input to the component database; an image recognition unit that individually extracts, from an image captured by the image capture device, features that allow the individual components to be identified, and retrieves the IDs of the individual components and the position data of the components on the basis of the features; a query generation unit that generates a query including the IDs of the individual components retrieved on the basis of the features; a data retrieving unit that retrieves, in the case where a query is generated, by using the query, the three-dimensional models and constraint data of the individual components associated with the individual IDs included in the query, from the component database; a component arrangement unit that arranges the individual components in a virtual space corresponding to the real space on the basis of the position data, three-dimensional models, and constraint data retrieved for the individual components; a consistency determination unit that determines the consistency of the positions of the individual arranged components on the basis of the positional relationship between the individual arranged components; a three-dimensional object recognition unit that, in the case where it is determined that there is consistency, recognizes the three-dimensional object on the basis of the positions of the individual arranged components; and in the case where it is determined that there is no consistency, a database storage unit that stores, in the history database, query data for storage including at least the IDs of the individual components in the query used by the data retrieving unit; a query regeneration determination unit that determines whether or not to regenerate a query on the basis of the query data for storage stored in the history database and the data stored in the component database; and a query regeneration unit that generates, in the case where it is determined to regenerate a query, a query including data different from the query data for storage stored in the history database.

In order to achieve the above object, a method according to an aspect of the present invention is a method for recognizing a three-dimensional object present in a real space and constituted of a plurality of predefined components, the method being executed by an electronic device provided with an image capture device for capturing an image of the three-dimensional object, the method being characterized by including: an image recognition step for individually extracting, from an image captured by the image capture device, features that allow the individual components to be identified, and retrieving the IDs of the individual components and the position data of the components on the basis of the features; a query generation step for generating a query including the IDs of the individual components retrieved on the basis of the features; a data retrieving step for retrieving, in the case where a query is generated, by using the query, the three-dimensional models and constraint data of the individual components associated with the individual IDs included in the query, from a component database that stores, in association with each other, the IDs of the individual components, the three-dimensional models of the individual components, and constraint data indicating joining constraint conditions between the individual components; a component arrangement step for arranging the individual components in a virtual space corresponding to the real space on the basis of the position data, three-dimensional models, and constraint data retrieved for the individual components; a consistency determination step for determining the consistency of the positions of the individual arranged components on the basis of the positional relationship between the individual arranged components; in the case where it is determined that there is consistency, a three-dimensional object recognition step for recognizing the three-dimensional object on the basis of the positions of the individual arranged components; and in the case where it is determined that there is no consistency, a database storage step for storing, in a history database, query data for storage including at least the IDs of the individual components in the query used in the data retrieving step, a query regeneration determination step for determining whether or not to regenerate a query on the basis of the query data for storage stored in the history database and the data stored in the component database, and a query regeneration step for generating, in the case where it is determined to regenerate a query, a query including data different from the query data for storage stored in the history database.

Advantageous Effects of Invention

According to the present invention, it is possible to recognize a three-dimensional shape from a single image.

DESCRIPTION OF EMBODIMENT

A three-dimensional object recognition system 1 according to an embodiment of the present invention will be described below with reference to the drawings. In this specification, unnecessarily detailed descriptions may be omitted for convenience of description. For example, detailed descriptions about well-known matters or overlapping descriptions of the same configuration may be omitted.

The three-dimensional object recognition system 1 according to the embodiment of the present invention is a system for recognizing a three-dimensional object present in a real space and formed by assembling a plurality of predefined components 5 having known shapes and sizes. In this specification, a three-dimensional object present in a real space and formed by assembling a plurality of components 5 may particularly be referred to as a structure. A technical feature of the embodiment of the present invention is that the three-dimensional object recognition system 1 recognizes a structure formed as described above from a single plane image. Even if the shapes and sizes of individual components 5 are known, it is understood that a structure formed by freely assembling the components 5 is unknown.

It is assumed that a component 5 in a real space in this specification is a rigid body having a volume or shape not substantially changing when another component 5 comes into contact with said component 5 or when another component 5 is placed on said component 5. In addition, in this specification, forming a structure by making two components 5 come into contact with each other is referred to as joining two components 5. For example, joining two components 5 indicates that one component 5 and another component 5 come into contact with each other, one component 5 and another component 5 are fitted and fixed to each other, one component 5 is placed on another component 5, etc.

Figure 1:
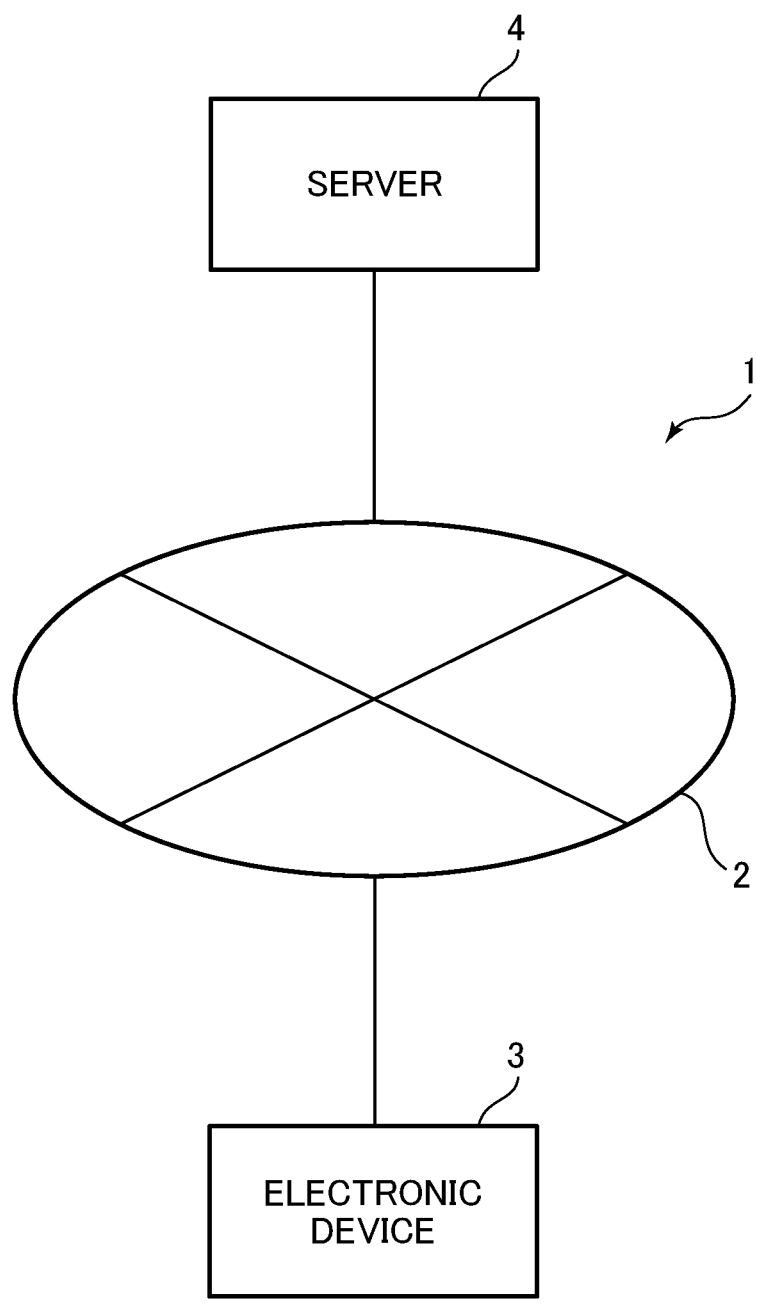
FIG. 1 is an overall configuration diagram of a three-dimensional object recognition system according to an embodiment of the present invention.

FIG. 1 is an overall configuration diagram of the three-dimensional object recognition system 1 according to the embodiment of the present invention. As shown in FIG. 1, the three-dimensional object recognition system 1 includes an electronic device 3 and a server 4, and the electronic device 3 and the server 4 are connected to a network 2 such as the Internet and can communicate with each other.

Figure 2:
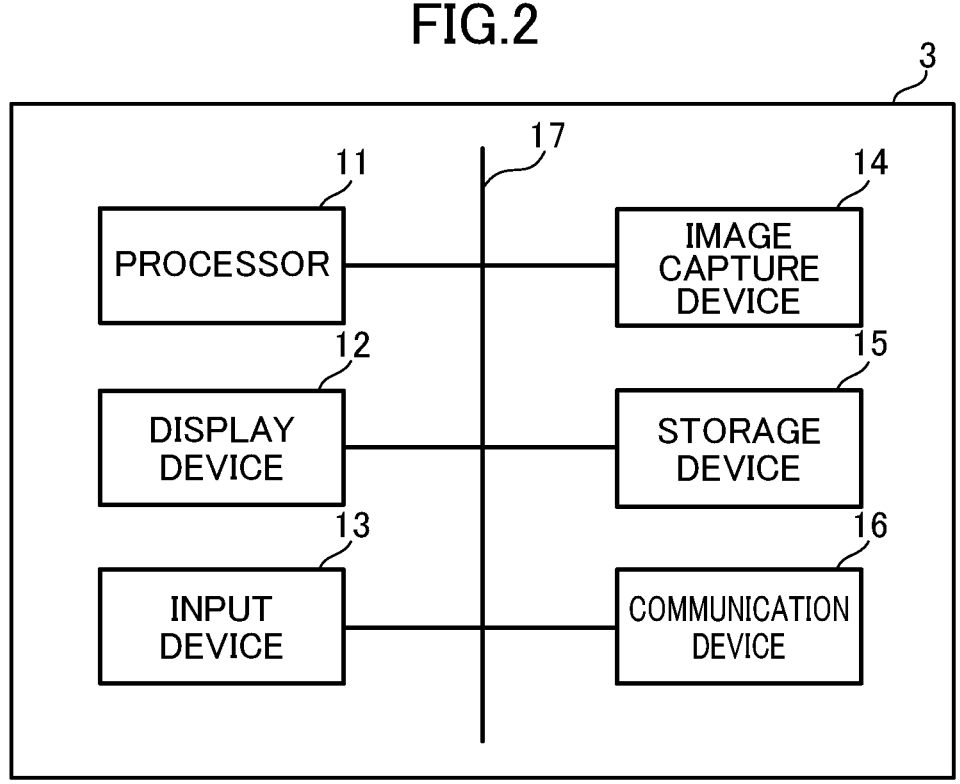
FIG. 2 is a block diagram showing the hardware configuration of an electronic device according to the embodiment of the present invention.

FIG. 2 is a block diagram showing the hardware configuration of the electronic device 3 according to the embodiment of the present invention. The electronic device 3 includes a processor 11, a display device 12, an input device 13, an image capture device 14, a storage device 15, and a communication device 16. These components are connected to each other via a bus 17. If necessary, an interface is provided between each component and the bus 17. In this embodiment, the electronic device 3 is a smartphone. However, the electronic device 3 may be a portable electronic terminal having the above-described configuration, such as a tablet computer or a computer equipped with a contact-type input device, such as a touchpad.

The processor 11 controls the operation of the electronic device 3 as a whole and is, for example, a CPU. As the processor 11, an electronic circuit such as an MPU may be used. The processor 11 executes various kinds of processing by reading and executing programs or data stored in the storage device 15. In one example, the processor 11 is constituted of a plurality of processors.

The display device (display) 12 displays an application screen or an image captured by the image capture device 14 to a user of the electronic device 3 in accordance with the control by the processor 11. The display device 12 is preferably a liquid crystal display, but may be an organic-EL-based display, a plasma display, etc.

The input device 13 is a user interface for accepting an input from a user to the electronic device 3 and is, for example, a touch panel, a touch pad, a keyboard, or a mouse. In this embodiment, the electronic device 3 is a smartphone, and thus, the electronic device 3 includes a touch panel as the input device 13, the touch panel also functions as the display device 12, and the display device 12 and the input device 13 are constructed in an integrated form. However, the display device 12 and the input device 13 may be disposed at separate positions in separate forms.

The image capture device (imaging device) 14 captures (images) a still picture or a moving picture of a real space and stores the captured image or moving picture data in the storage device 15. The image capture device 14 is, for example, a camera constituted of an image sensor, etc.

The storage device 15 is a storage device provided in an ordinary smartphone, including a RAM, which is a volatile memory, and a ROM, which is a non-volatile memory. The storage device 15 may also include an external memory.

In one example, the storage device 15 includes a main storage device and an auxiliary storage device. The main storage device is a volatile storage medium from/to which information can be read/written at high speed, and is used for a storage area and a work area when the processor 11 processes information. The auxiliary storage device stores various programs or data used by the processor 11 when executing each program. The auxiliary storage device is, for example, a hard disk device, but may be any kind of non-volatile storage or non-volatile memory that can store information, which may be removable. The auxiliary storage device stores, for example, an operating system (OS), middleware, an application program, and various kinds of data that may be referred to in relation to the execution of the programs.

The communication device 16 transmits data to and receives data from another computer such as the server 4 via the network 2. For example, the communication device 16 carries out wireless communications such as mobile communications or wireless LAN communications to connect to the network 2. In one example, the communication device 16 downloads a program from the server 4 and stores the program in the storage device 15. However, the communication device 16 may carry out wired communications via an Ethernet (registered trademark) cable, etc.

Figure 3:
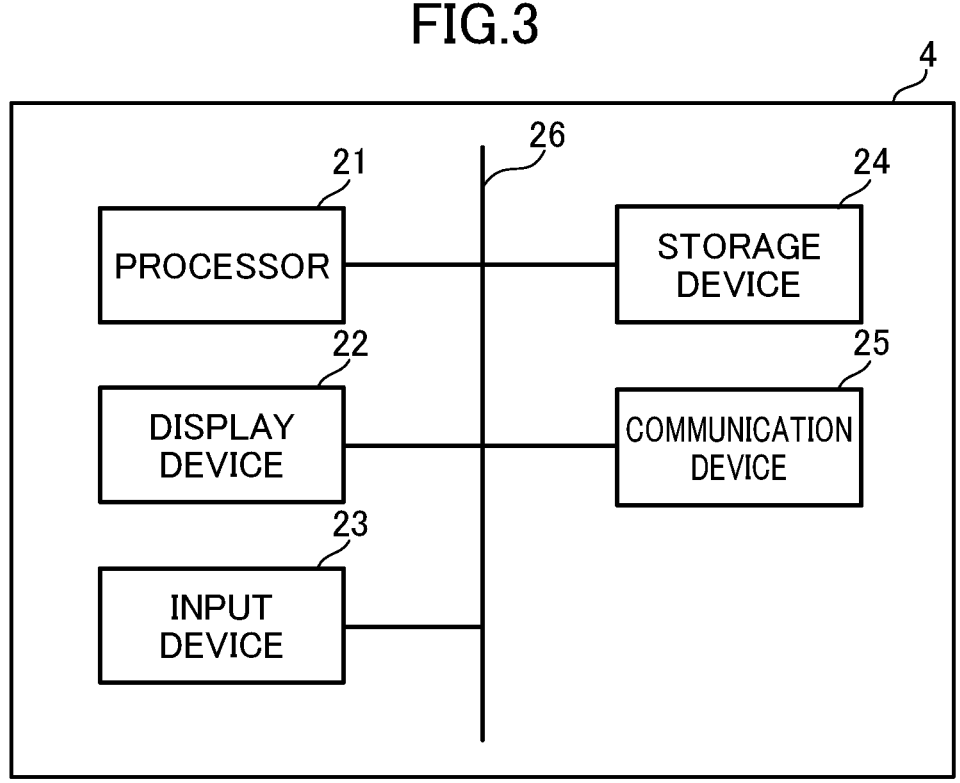
FIG. 3 is a block diagram showing the hardware configuration of a server according to the embodiment of the present invention.

FIG. 3 is a block diagram showing the hardware configuration of the server 4 according to the embodiment of the present invention. The server 4 includes a processor 21, a display device 22, an input device 23, a storage device 24, and a communication device 25. These components are connected to each other via a bus 26. If necessary, an interface is provided between each component and the bus 26.

The processor 21 controls the operation of the server 4 as a whole and is, for example, a CPU. As the processor 21, an electronic circuit such as an MPU may be used. The processor 21 executes various kinds of processing by reading and executing programs or data stored in the storage device 24. In one example, the processor 21 is constituted of a plurality of processors.

The display device (display) 22 displays an application screen, etc. to a user of the server 4 in accordance with the control by the processor 21. The input device 23 accepts an input from a user to the server 4 and is, for example, a touch panel, a touch pad, a keyboard, or a mouse.

The storage device 24 includes a main storage device and an auxiliary storage device. The main storage device is, for example, a semiconductor memory such as a RAM. The RAM is a volatile storage medium from/to which information can be read/written at high speed, and is used for a storage area and a work area when the processor 21 processes information. The main storage device may include a ROM, which is a read-only non-volatile storage medium. In this case, the ROM stores a program such as firmware. The auxiliary storage device stores various programs or data used by the processor 21 when executing each program. The auxiliary storage device is, for example, a hard disk device, but may be any kind of non-volatile storage or non-volatile memory that can store information, which may be removable. The auxiliary storage device stores, for example, an operating system (OS), middleware, an application program, various kinds of data that may be referred to in relation to the execution of the programs.

In one preferred example, the storage device 24 stores data (such as a table) or programs for various kinds of databases. The various kinds of databases are realized by the operation of the processor 21, etc. The server 4 may include a database server function, may include one or more database servers, or may include other servers.

The communication device 25 is a device for transmitting data to and receiving data from another computer such as the electronic device 3 via the network 2. For example, the communication device 25 carries out wired communications via an Ethernet (registered trademark) cable, etc. or carries out wireless communications such as mobile communications or wireless LAN communications to connect to the network 2.

Figure 4:
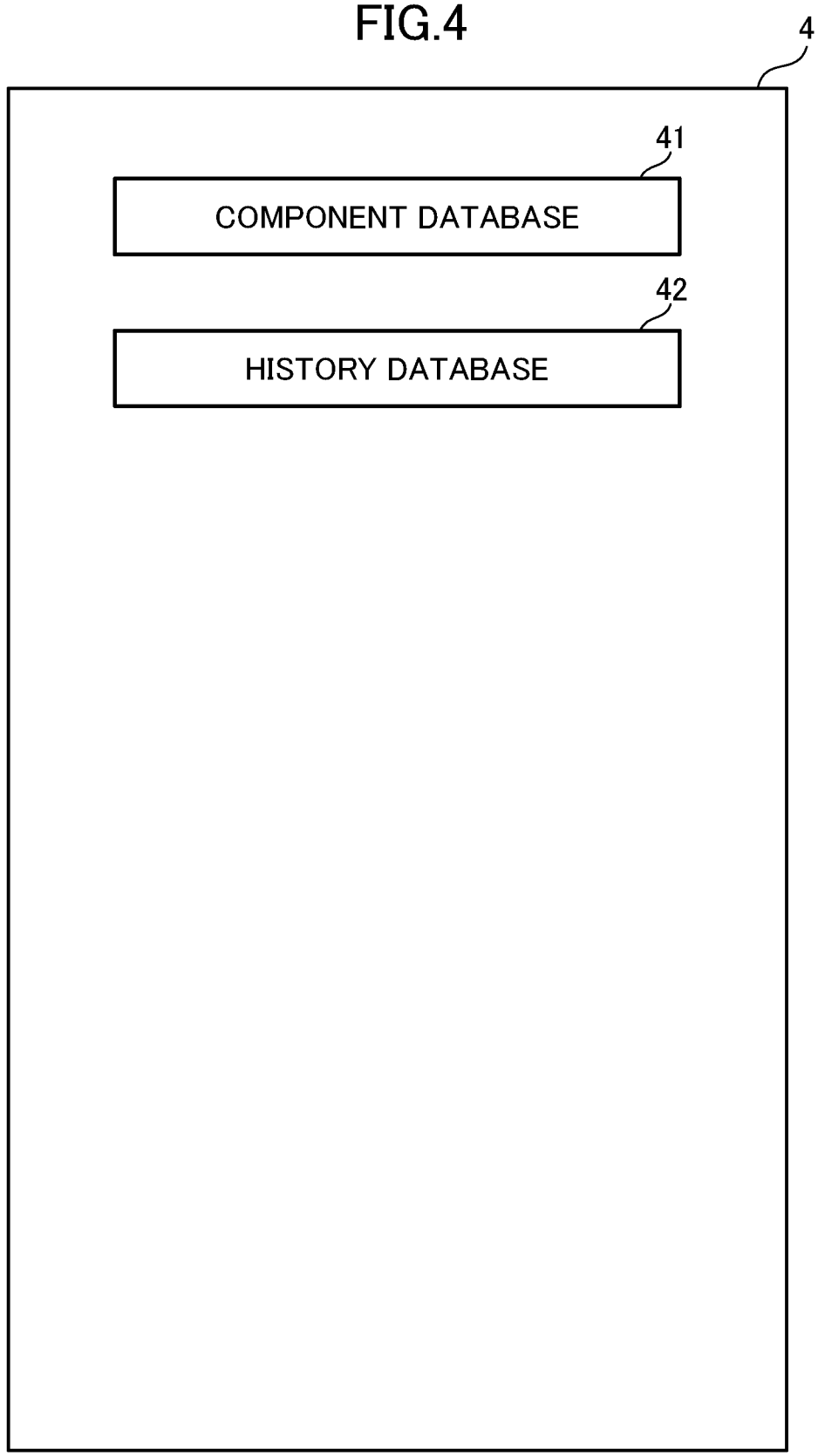
FIG. 4 shows an example of a functional block diagram of the server according to the embodiment of the present invention.

FIG. 4 shows an example of the functional block diagram of the server 4 according to the embodiment of the present invention. The server 4 includes a component database 41 and a history database 42. In this embodiment, these functions are realized by the processor 21 executing a program. In this way, various kinds of functions are realized by loading a program, and thus, a part of one database may be implemented in another database.

As described above, the three-dimensional object recognition system 1 recognizes a structure present in a real space and constituted of a plurality of predefined components 5. The component database 41 stores the component IDs of individual components 5, the three-dimensional model data (three-dimensional model) of the components 5, and constraint data indicating joining constraint conditions between the components 5, in association with each other. The electronic device 3 uses a query to retrieve data from the component database 41.

Component IDs are data indicating unique identification information for identifying components 5. Components 5 stored in the component database 41 are respectively associated with component IDs. A structure is formed of some or all of the components 5 stored in the component database 41. In the case where there are a plurality of components 5 having the same shape and size, the components 5 have the same component ID. In this case, the component database 41 stores the number of components 5 by further associating the number with the component ID. However, it is possible to configure all of components 5 to have different component IDs such that the component database 41 does not store the number of components 5.

Three-dimensional models are data defining the shapes and sizes of components 5 and are, for example, data represented by wire frame models or polygon meshes.

Constraint data is alignment metadata defining joining constraint conditions between components 5 stored in the component database 41. Joining constraint conditions are geometric constraints imposed when components 5 are joined, and define a relative positional relationship between two components 5.

Alignment metadata is data defining constraints on at least one of the six degrees of freedom (6DoF) in a relative positional relationship between two components 5. 6DoF are the degrees of freedom with respect to the position and orientation of a three-dimensional object in a three-dimensional space, consisting of coordinates and rotation directions. The component database 41 stores the component ID of a specific component 5 in association with alignment metadata defining constraints on the relationship between the specific component 5 and each of other components 5.

The alignment metadata of a specific component 5, i.e., the alignment metadata associated with the component ID of the specific component 5 includes data defining constraints on the relationship between the specific component 5 and every component 5 that can be joined to the specific component 5. In one example, in the case where the component database 41 includes only one specific component 5, alignment metadata associated with the component ID of the specific component 5 includes data defining constraints on the relationship between the specific component 5 and every component 5 other than the specific component 5. In one example, in the case where the component database 41 includes a plurality of specific components 5, alignment metadata associated with the component ID of the specific components 5 includes data defining constraints on the relationship between the specific components 5 and every component 5 including the specific components 5.

The component database 41 stores the three-dimensional models and alignment metadata of components 5 by using a coordinate system common to all of the components 5. Preferably, the three-dimensional model or alignment metadata of each of the components 5 stored in the component database 41 is represented by a three-axis coordinate system having the center of the component 5 as an origin.

In one preferred example, in all components 5, when an arbitrary point on the component surface is defined as a joining reference point 6, the alignment metadata of a specific component 5 is defined by conditions regarding distances and angles between the joining reference point 6 of the specific component 5 and the joining reference points 6 of other components 5. Focusing on the relationship between a pair of components 5, the alignment metadata (alignment-data) of one component 5 can be described as an array having, as the elements thereof, a positional constraint (positional-constraint) and an orientational constraint (orientational-constraint), as indicated in Eq. 1-Eq. 3 below.

$$\text{alignment-data} := \text{array of (positional-constraint, orientational-constraint)} \quad \text{(Eq. 1)}$$

$$\text{positional-constraint} := (x,y,z,[d_x^{min},d_x^{max}],[d_y^{min},d_y^{max}],[d_z^{min},d_z^{max}]) \quad \text{(Eq. 2)}$$

$$\text{orientational-constraint} := ([a_r^{min},a_r^{max}],[a_p^{min},a_p^{max}],[a_y^{min},a_y^{max}]) \quad \text{(Eq. 3)}$$

In Eq. 1 to Eq. 3,
(x,y,z)
indicates the coordinates of the joining reference point of the one component 5.

$[d_x^{min}, d_x^{max}]$ indicates the minimum value and the maximum value of a distance in the x-axis direction between the joining reference point of the one component 5 and the joining reference point of the other component 5.

$[d_y^{min}, d_y^{max}]$ indicates the minimum value and the maximum value of a distance in the y-axis direction between the joining reference point of the one component 5 and the joining reference point of the other component 5.

$[d_z^{min}, d_z^{max}]$ indicates the minimum value and the maximum value of a distance in the z-axis direction between the joining reference point of the one component 5 and the joining reference point of the other component 5.

$[a_r^{min}, a_r^{max}]$ indicates the minimum value and the maximum value of a difference in an angle of rotation around the x-axis (rotation angle difference with respect to roll) between the joining reference point of the one component 5 and the joining reference point of the other component 5.

$[a_p^{min}, a_p^{max}]$ indicates the minimum value and the maximum value of a difference in an angle of rotation around the y-axis (rotation angle difference with respect to pitch) between the joining reference point of the one component 5 and the joining reference point of the other component 5.

$[a_y^{min}, a_y^{max}]$ indicates the minimum value and the maximum value of a difference in an angle of rotation around the z-axis (rotation angle difference with respect to yaw) between the joining reference point of the one component 5 and the joining reference point of the other component 5.

The alignment metadata indicated in Eq. 1-Eq. 3 is data defining constraints on the relationship between one component 5 and another component 5. The component database 41 stores alignment metadata defining constraints on the relationship between one component 5 and every component 5 that can be joined to the one component 5, in association with the component ID of the one component 5. In addition, in the case where one component 5 has a plurality of joining surfaces, the one component 5 can have a plurality of joining reference points. In this case, regarding the data defining constraints on the relationship between one component 5 and another component 5, alignment metadata can have data indicated in Eq. 1-Eq. 3 for each of the joining reference points, and the elements of positional and orientational constraints can be treated as data belonging to the joining reference points. Hereinafter, in this embodiment, it is assumed that the constraint data of one component 5 has alignment metadata for each of components 5 that can be joined to the one component 5. In addition, it is assumed that the alignment metadata has a joining reference point 6 and the elements of positional and orientational constraints as data belonging to the joining reference point 6.

In one example, in the case where two components 5 ($P_1$ and $P_2$) each having one joining reference point are joined, the following equations are established when the alignment data of the components 5 are represented by using subscripts.

$$\max(d_{x1}^{min}, d_{x2}^{min}) \leq |x_1 - x_2| \leq \min(d_{x1}^{max}, d_{x2}^{max}) \quad \text{(Eq. 4)}$$

$$\max(d_{y1}^{min}, d_{y2}^{min}) \leq |y_1 - y_2| \leq \min(d_{y1}^{max}, d_{y2}^{max}) \quad \text{(Eq. 5)}$$

$$\max(d_{z1}^{min}, d_{z2}^{min}) \leq |z_1 - z_2| \leq \min(d_{z1}^{max}, d_{z2}^{max}) \quad \text{(Eq. 6)}$$

$$\max(a_{r1}^{min}, a_{r2}^{min}) \leq |roll_1 - roll_2| \leq \min(a_{r1}^{max}, a_{r2}^{max}) \quad \text{(Eq. 7)}$$

$$\max(a_{p1}^{min}, a_{p2}^{min}) \leq |pitch_1 - pitch_2| \leq \min(a_{p1}^{max}, a_{p2}^{max}) \quad \text{(Eq. 8)}$$

$$\max(a_{y1}^{min}, a_{y2}^{min}) \leq |yaw_1 - yaw_2| \leq \min(a_{y1}^{max}, a_{y2}^{max}) \quad \text{(Eq. 9)}$$

Because the rotation direction of a three-dimensional object can be different depending on the selected order of the axes, it is assumed that, for example, the order is determined to be a specific order in one application. In one example, the minimum value and the maximum value of a distance between the joining reference point of one component and the joining reference point of another arbitrary component in at least one of the x-axis direction, the y-axis direction, and the z-axis direction are $[0, \infty]$, and the minimum value and the maximum value of at least one of roll, pitch, and yaw between the joining reference point of the one component and the joining reference point of the other arbitrary component are $[-180, 180]$. By doing so, flexibility regarding part of degrees of freedom is allowed in constraint conditions. In another example, alignment metadata is configured not to define constraints on any of the 6DoF. In this case, the component database 41 need not store constraint data.

The history database 42 stores query data for storage including at least the IDs of individual components in a query input from the electronic device 3 to the component database 41. The query input to the component database 41 is, for example, a query used by the electronic device 3 to search the component database 41 for data and retrieve the data.

Figure 5:
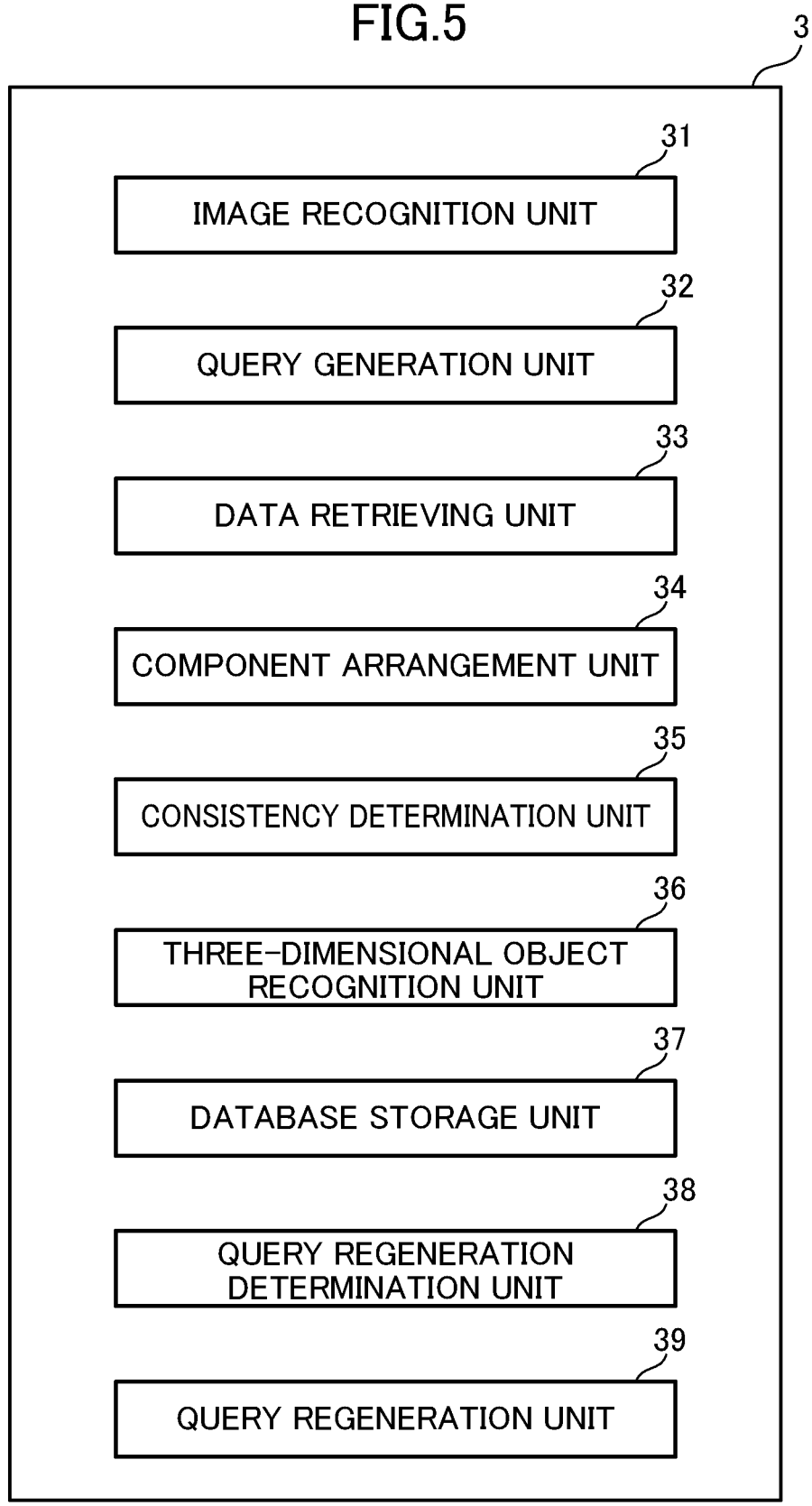
FIG. 5 shows an example of a functional block diagram of the electronic device according to the embodiment of the present invention.

FIG. 5 shows an example of the functional block diagram of the electronic device 3 according to the embodiment of the present invention. The electronic device 3 includes an image recognition unit 31, a query generation unit 32, a data retrieving unit 33, a component arrangement unit 34, a consistency determination unit 35, a three-dimensional object recognition unit 36, a database storage unit 37, a query regeneration determination unit 38, and a query regeneration unit 39. In this embodiment, these functions are realized by the processor 11 executing a program. In this way, various kinds of functions are realized by loading a program, and thus, a part or the entirety of one part (function) may be implemented in another part. However, these functions may be realized by hardware by configuring an electronic circuit, etc. for realizing a part or the entirety of each function.

First, components 5 used in the three-dimensional object recognition system 1 will be described. Each of a plurality of components 5 has, on the surface thereof, a marker that allows the component 5 to be identified. In one preferred example, the marker is an AR marker, which is constituted of, for example, a rectangular black frame and a laterally asymmetrical dot pattern drawn in the frame. Like this, the marker has a shape that makes it possible to retrieve, from an image acquired by capturing an image of the marker, the position and orientation of the marker with respect to the image capture device 14, and has a feature pattern that allows each component 5 to be identified. However, each of the plurality of components 5 may have, on the surface thereof, a feature that allows each component 5 to be identified and that is different from the marker that allows each component 5 to be identified. For example, the plurality of components 5 may be configured such that each of the plurality of components 5 has only a feature pattern that allows each component 5 to be identified, and the feature pattern allows each component 5 to be identified while making it possible to retrieve, from a captured image, the position and orientation of the feature pattern with respect to the image capture device 14.

The image recognition unit 31 individually extracts, from an image captured by the image capture device 14, markers that allows individual components 5 to be identified. The image recognition unit 31 retrieves the component IDs of the individual components 5 from the extracted markers and retrieves the position data of the individual components 5 on the basis of the shapes and sizes of the markers in the captured image. In this way, the image recognition unit 31 recognizes the individual components 5 in the captured image. In one example, the position data of each component 5 retrieved by the image recognition unit 31 is the position of a marker recognition reference point represented by a camera coordinate system, and indicates a relative position with respect to the image capture device 14. In one example, the position data is a 6DoF (six degrees of freedom) position. In another example, the position data is represented by a quaternion, etc. The image recognition unit 31 may include a function provided by a known image recognition technology, and the position data of each component 5 retrieved by the image recognition unit 31 may be an approximate position.

The component database 41 stores, in association with a component ID, the shape, size, and feature pattern of a marker on the surface of a component 5 associated with the component ID, and the position of the marker on the component 5. The position of the marker on the component 5 is, for example, the position of a marker recognition reference point recognized by the image recognition unit 31, and is represented by a three-axis coordinate system having the center of the component 5 as an origin. In addition, the component database 41 stores, in association with a component ID, the position of the joining reference point 6 of a component 5 associated with the component ID. The position of the joining reference point 6 is stored in the same manner as the position of a marker on the component 5, and is represented by, for example, a three-axis coordinate system having the center of the component 5 as an origin.

Figure 6:
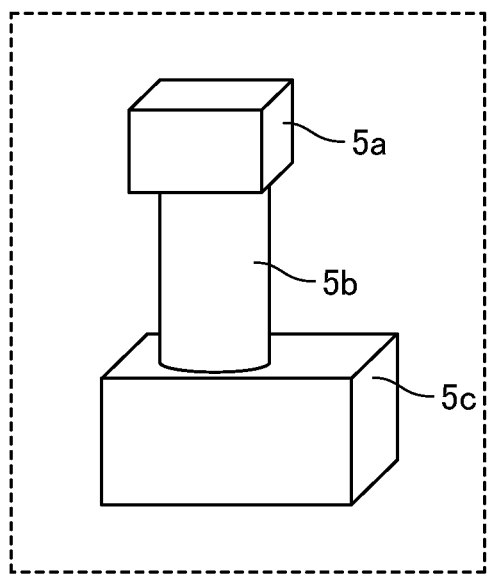
FIG. 6 is a diagram showing an example of an image captured by the image capture device.
Figure 7:
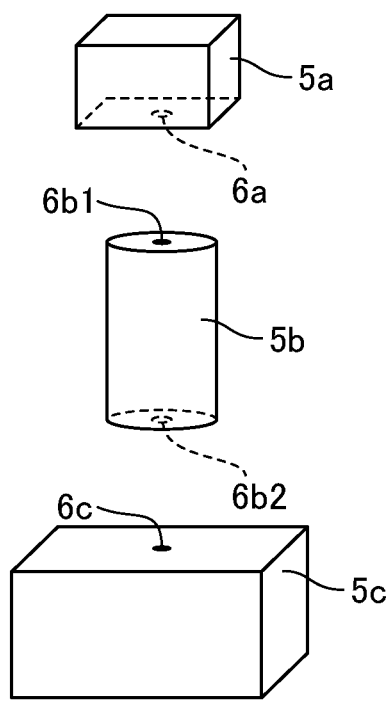
FIG. 7 is a diagram showing three components recognized by an image recognition unit from the captured image shown in FIG. 6.

FIG. 6 is a diagram showing an example of an image captured by the image capture device 14, and a structure constituted of three components 5 (5a, 5b, 5c) appears in the captured image. The image recognition unit 31 extracts three markers from the captured image shown in FIG. 6, and individually recognizes the three components 5 by acquiring, from the extracted markers, component IDs associated with the three components 5 and the position data of the components 5. FIG. 7 is a diagram showing the three components 5a, 5b, 5c recognized by the image recognition unit 31 from the captured image shown in FIG. 6, and shows the joining reference points 6 (6a, 6b1, 6b2, 6c) of the three individual components 5. It can be seen that the component 5b has the two joining reference points 6b1 and 6b2. For example, in the case where the marker on the center component does not appear in the captured image, the image recognition unit 31 recognizes only the components 5 at both ends.

The query generation unit 32 generates a query including component IDs retrieved by the image recognition unit 31. When a query is generated, the data retrieving unit 33 uses the generated query to retrieve, from the component database 41, the three-dimensional models and constraint data of components 5 associated with the individual component IDs included in the query.

The query includes component IDs and data belonging to the component IDs, and is defined as, for example, an array having this data as the elements thereof. The data belonging to the component IDs include the position data of the components 5 associated with the component IDs. The position data of the components 5 are retrieved by the image recognition unit 31. In addition, the data belonging to the component IDs include three-dimensional models and constraint data.

The query used by the data retrieving unit 33 to retrieve data may include component IDs retrieved by the image recognition unit 31 and the position data of components 5 associated with the component IDs. In one example, the data retrieving unit 33 respectively adds, to a query used to search the component database 41, the three-dimensional models and constraint data of individual components 5 associated with component IDs included in the query, in association with the component IDs. By doing so, the data retrieving unit 33 retrieves the three-dimensional models and constraint data of the components 5 associated with the individual component IDs.

For each component ID included in the query, the component arrangement unit 34 arranges the associated component 5 in a virtual space corresponding to a real space on the basis of the position data retrieved by the image recognition unit 31 and the three-dimensional model and constraint data retrieved by the data retrieving unit 33. First, for each component ID included in the query, the component arrangement unit 34 arranges the associated component 5 in the virtual space by using the three-dimensional model and position data.

Next, the component arrangement unit 34 individually identifies pairs of components 5 adjacent to each other among the arranged components 5 by determining whether or not the pairs of the arranged components 5 are adjacent to each other. In one example, the component arrangement unit 34 determines whether or not the distance between the joining reference points 6 of two components 5 arranged first is within a prescribed value, and in the case where the distance is within the prescribed value, determines that the two components 5 are adjacent to each other. The component arrangement unit 34 can determine that one component 5 is adjacent to a plurality of components 5.

Next, the component arrangement unit 34 selects, in a prescribed order, a pair of components 5 from among the pairs of components 5 determined to be adjacent to each other. For each pair of components 5 determined to be adjacent to each other, the component arrangement unit 34 moves or rotates (hereinafter referred to as "moves, etc.") one of the two components 5 to satisfy joining constraint conditions, and confirms the arrangement. In this way, the component arrangement unit 34 arranges each component 5 while making adjustments. In the case where joining constraint conditions are satisfied, the component arrangement unit 34 confirms the arrangement without moving, etc. the components 5. So as to satisfy joining constraint conditions, the component arrangement unit 34 does not move, etc. a component 5 determined not to be adjacent to any component 5.

In one example, the component arrangement unit 34 selects a pair of components 5 in such an order that a pair of components 5 including a component 5 having a higher priority is selected first. In this case, the component database 41 further stores, in association with a component ID, priority information related to the priority of a component 5 associated with the component ID. The priority of a component 5 is defined in advance by a system manager, and for example, a higher priority is set for a component 5 that can be important in forming a structure. When a query is generated, the data retrieving unit 33 uses the generated query to further retrieve, from the component database 41, the priority information of each component 5 associated with each component ID included in the query. In another example, the image recognition unit 31 recognizes component IDs and calculates the accuracy of the recognition, and the component arrangement unit 34 selects a pair of components 5 in such an order that a pair of components 5 including a component 5 having higher accuracy is selected first.

In one example, in the case where one of two components 5 needs to be moved, etc. and the arrangement of one of the components 5 has already been confirmed, the component arrangement unit 34 moves, etc. the component 5 that has not been confirmed so as to satisfy joining constraint conditions. In another example, in the case where one of two components 5 needs to be moved, etc. and the arrangements of both of the components 5 have already been confirmed, the component arrangement unit 34 moves, etc. a component 5 having a lower priority or a component 5 having lower accuracy of recognition by the image recognition unit 31 so as to satisfy joining constraint conditions.

Figure 8:
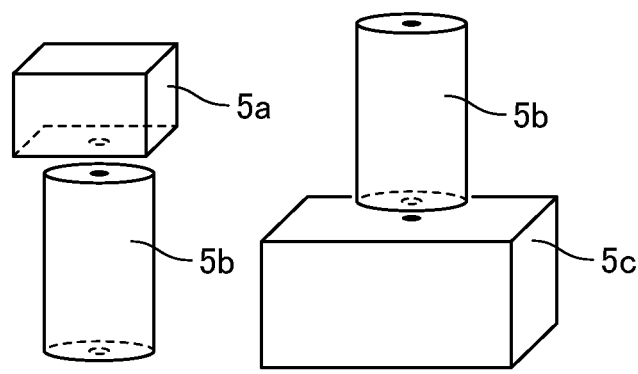
FIG. 8 is a diagram showing a state in which, from among the three components recognized by the image recognition unit, shown in FIG. 7, a component arrangement unit individually identifies pairs of adjacent components and moves, etc. the pairs of components so as to satisfy joining constraint conditions.

FIG. 8 is a diagram showing a state in which, from among three components 5 recognized by the image recognition unit 31, shown in FIG. 7, the component arrangement unit 34 individually identifies pairs of components 5 adjacent to each other and moves, etc. the pairs of components 5 so as to satisfy joining constraint conditions.

The consistency determination unit 35 determines the consistency of the positions of individual components 5 arranged by the component arrangement unit 34, on the basis of the positional relationship of the individual arranged components 5.

In one example, the consistency determination unit 35 determines the consistency of the positions of individual arranged components 5 on the basis of the degree of overlapping among areas occupied by the three-dimensional models of the individual arranged components 5. Specifically, (a) in the case where the degree of overlapping among areas occupied by the three-dimensional models of the individual arranged components 5 is within a prescribed volume, the consistency determination unit 35 determines that there is consistency, and (b) in the case where the degree of overlapping exceeds the prescribed volume, the consistency determination unit 35 determines that there is no consistency. The above-described prescribed volume can be zero, or can be defined for the three-dimensional model of each component 5.

In one example, the image recognition unit 31 recognizes, from image data captured by the image capture device 14, a base part forming a base portion on which a structure is placed. For example, in the case where a structure is placed on a desk, a surface of the desk on which the structure is placed serves as the base part. The component arrangement unit 34 arranges the base part in a virtual space and determines whether or not individual arranged components 5 are adjacent to the base part. In the case where the base part and the components 5 are moved, etc. so as to satisfy joining constraint conditions, it is preferable that the component arrangement unit 34 moves, etc. the components 5 and confirms the arrangement. The consistency determination unit 35 determines whether or not the individual arranged components 5 are arranged in conformance with gravity on the basis of the positional relationship between the positions of the individual arranged components 5 and the position of the base part. Specifically, the consistency determination unit 35 determines that there is consistency in the case where the individual arranged components 5 are arranged in conformance with gravity, and determines that there is no consistency in the case where the individual arranged components 5 are not arranged in conformance with gravity.

For example, in FIG. 6, in the case where the image recognition unit 31 recognizes only components 5 at both ends, a query generated by the query generation unit 32 does not include the component ID of the component 5*b*, and the component arrangement unit 34 arranges the components 5*a* and 5*c* in a virtual space. The component arrangement unit 34 recognizes the direction of gravity on the basis of the positional relationship between the base part and the component 5*c*, and because the component 5*a* is arranged with a gap between the component 5*a* and the component 5*c*, the component arrangement unit 34 determines that the component 5*a* is not arranged in conformance with gravity and determines that there is no consistency.

In one example, the consistency determination unit 35 determines consistency on the basis of the degree of matching between an image captured by the image capture device 14 and an image, viewed from a virtual camera, of individual components 5 arranged in a virtual space by the component arrangement unit 34. Specifically, the consistency determination unit 35 determines that there is consistency in the case where the degree of matching is equal to or more than a predefined default value, and determines that there is no consistency in the case where the degree of matching is less than the default value. Here, the virtual camera is arranged at a position in the virtual space corresponding to the position of the image capture device 14.

In one example, in the case where it is determined that there is no consistency, the consistency determination unit 35 calculates a consistency evaluation value for the positions of individual components 5 arranged by the component arrangement unit 34. For example, in the case where the consistency determination unit 35 makes a determination on the basis of the degree of overlapping among areas occupied by the three-dimensional models of the individual arranged components 5, the evaluation value is calculated in accordance with the degree by which the volume of overlapping areas exceeds a prescribed volume. In addition, for example, in the case where the consistency determination unit 35 makes a determination on the basis of the degree of matching of image data, the evaluation value is calculated in accordance with the degree of matching.

Although the above-described consistency determination made by the consistency determination unit 35 is for components 5 arranged in a virtual space as a whole, the consistency determination unit 35 can determine consistency for each of the components 5. In one example, in the case where the consistency determination unit 35 determines the consistency of the positions of individual arranged components 5 on the basis of the degree of overlapping among areas occupied by the three-dimensional models of the individual components 5, a component 5 having a higher priority is determined to have consistency, and a component 5 having a lower priority is determined not to have consistency.

In the case where the consistency determination unit 35 determines that there is consistency, the three-dimensional object recognition unit 36 recognizes a structure on the basis of the positions of the individual components 5 arranged by the component arrangement unit 34. For example, the three-dimensional object recognition unit 36 recognizes a structure by means of the three-dimensional models and position data of individual components 5 arranged by the component arrangement unit 34 in a virtual space, and recognizes the three-dimensional model of the entire structure. Preferably, the three-dimensional object recognition unit 36 reconstructs the three-dimensional model of the recognized entire structure in the virtual space.

Figure 9:
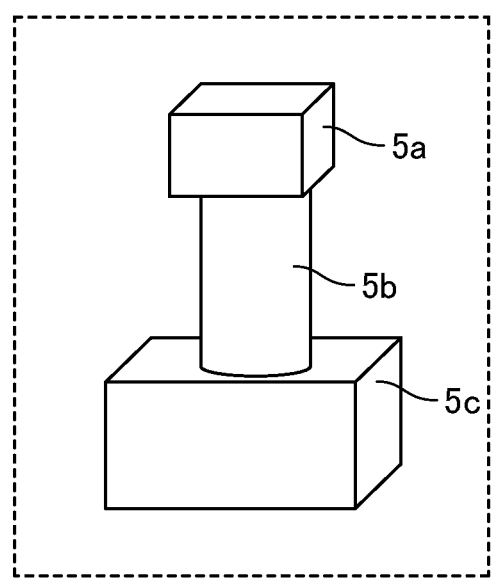
FIG. 9 is a diagram showing a structure recognized by the three-dimensional object recognition unit by means of the components, shown in FIG. 8, the arrangement of which has been confirmed by the component arrangement unit.

FIG. 9 is a diagram showing a structure recognized by the three-dimensional object recognition unit 36 by means of the components 5, shown in FIG. 8, the arrangement of which has been confirmed by the component arrangement unit 34. In FIGS. 6-9, it can be seen that a higher priority is given in the order of the components 5c, 5b, and 5a, and that the component arrangement unit 34 moved the component 5b of the pair of components 5b and 5c and moved the component 5a of the pair of components 5b and 5a.

In the case where the consistency determination unit 35 determines that there is no consistency, the database storage unit 37 stores query data for storage in the history database 42. The query data for storage is data including the component IDs of individual components 5 and joining reference points 6 used by the component arrangement unit 34, among data included in a query used by the data retrieving unit 33 to retrieve data from the component database 41. The joining reference points 6 used by the component arrangement unit 34 are joining reference points 6 used by the component arrangement unit 34 to make determinations with respect to joining constraint conditions, among joining reference points 6 included in constraint data associated with component IDs. Because information related to joining reference points 6 is included in alignment data stored for each pair of adjacent components 5, the query data for storage makes it possible to identify the adjacency relationship of components 5 arranged by the component arrangement unit 34. However, the query data for storage may be data including at least the component IDs of individual components 5, among data included in a query used by the data retrieving unit 33 to retrieve data from the component database 41, and thus is not limited to that in the above-described example.

In one example, the database storage unit 37 further stores, in the history database 42, in association with individual component IDs included in query data for storage, a consistency evaluation value for the positions of individual components 5 arranged by the component arrangement unit 34. In this case, in the case where the consistency determination unit 35 determines that there is no consistency, the consistency evaluation value is calculated. With such a configuration, it becomes possible to recognize a structure by using a query providing the highest consistency in the case where the consistency determination unit 35 determines that there is no consistency.

In one example, the database storage unit 37 further stores, in the history database 42, in association with individual component IDs included in query data for storage, the positions of individual components 5 arranged by the component arrangement unit 34. With such a configuration, in the case where the consistency determination unit 35 determines that there is no consistency, it becomes possible to recognize a structure by using the positions of the individual components 5 in the most consistent arrangement.

In one example, query data for storage is data for a query itself, and the database storage unit 37 stores, directly in the history database 42, a query used by the data retrieving unit 33 to retrieve data from the component database 41.

In the case where the consistency determination unit 35 determines that there is no consistency, the query regeneration determination unit 38 determines whether or not to regenerate a query on the basis of query data for storage stored in the history database 42 and data stored in the component database 41. Specifically, the query regeneration determination unit 38 determines whether or not the query data for storage stored in the history database 42 includes a prescribed combination among combinations of some or all of component IDs stored in the component database 41. In the case where the query data for storage stored in the history database 42 does not include the prescribed combination, the query regeneration determination unit 38 determines to regenerate a query, and in the case where the query data for storage includes the prescribed combination, the query regeneration determination unit 38 determines not to regenerate a query. Combinations of component IDs are combinations taking the arrangement order of components 5 into consideration. Although individual components 5 are joined only at joining reference points 6, when the same pair of components 5 are joined at different joining reference points 6, the type of joining becomes different. For example, in the case where there are four components 5, namely, components A-D, and each component 5 has two joining reference points 6 at both ends, all combinations of component IDs are combinations in which all of the components A-D are used for arrangement, and thus, there are 384 ($4! \times 2^4$) combinations. In this case, combinations of some of the component IDs are combinations in which some of the components A-D are used and the arrangement order of the components 5 is further taken into consideration. For example, combinations of some of the component IDs include 8 ($2! \times 2^2$) combinations in which the components B and C of the components A-D are used for arrangement, or 48 ($3! \times 2^3$) combinations in which the components A, B, and C of the components A-D are used for arrangement.

In one example, the query regeneration determination unit 38 compares NQ, which is the number of items of query data for storage stored in the history database 42 with NP, which is the number of all combinations of component IDs stored in the component database 41. In the case where the number NQ is less than the number NP, the query regeneration determination unit 38 determines to regenerate a query, otherwise the query regeneration determination unit 38 determines not to regenerate a query. As an example, the case where the number of components 5 stored in the component database 41 is n, each component 5 has a joining reference point 6 at both ends, and a structure is constituted of all of the components 5 stored in the component database 41 is considered. In this case, the total number of queries that can be generated by the query generation unit 32, i.e., NP, which is the number of all combinations of component IDs stored in the component database 41, can be represented as $$n! \times 2^n \qquad \text{(Eq. 10)}$$

on the basis of the number of arrangement patterns of components 5 and the number of joining reference points 6. In this way, the query regeneration determination unit 38 can make the number of query regenerations finite. In the above-described embodiment, it is assumed that every component 5 has two joining reference points and that a structure is constituted of all components 5 stored in the component database 41, but this is merely one example for simplifying the description. All n components need not be used for a structure, and each component 5 need not have two joining reference points 6.

In one example, when recognizing a component ID, the image recognition unit 31 calculates the accuracy of the recognition. In this example, the above-described prescribed combination among combinations of some or all of component IDs stored in the component database 41 includes a component ID recognized by the image recognition unit 31 with an accuracy equal to or more than a specific value.

In one example, the component database 41 stores, in association with a component ID, priority information related to the priority of a component 5 associated with the component ID. In this example, the above-described prescribed combination among combinations of some or all of component IDs stored in the component database 41 includes a component ID recognized by the image recognition unit 31 and having a priority equal to or more than a specific value.

In the case where the query regeneration determination unit 38 determines to regenerate a query, the query regeneration unit 39 generates a query including data different from query data for storage stored in the history database 42. As an example, the case where the number of components 5 stored in the component database 41 is n, each component 5 has two joining reference points 6 at both ends, and a structure is constituted of all of the components 5 stored in the component database 41 is considered. From among queries that are represented by Eq. 10 and that can be generated by the query generation unit 32, the query regeneration unit 39 generates a query not including any combination of component IDs included in query data for storage stored in the history database 42.

In one example, in the case where the distance between the three-dimensional models of two components 5 among components 5 arranged in a virtual space by the component arrangement unit 34 is equal to or more than a prescribed value, the query regeneration unit 39 generates a query to which the component ID of a component 5 corresponding to that distance is added. In one example, with respect to a component ID for which the accuracy of recognition by the image recognition unit 31 is less than a specific value, or a component ID determined not to have consistency, a query in which the position or orientation of a component having the component ID is changed, or a query in which the component ID is replaced with a different component ID is preferentially generated. This makes it possible to make the information processing of the three-dimensional object recognition system 1 more efficient.

Figure 10:
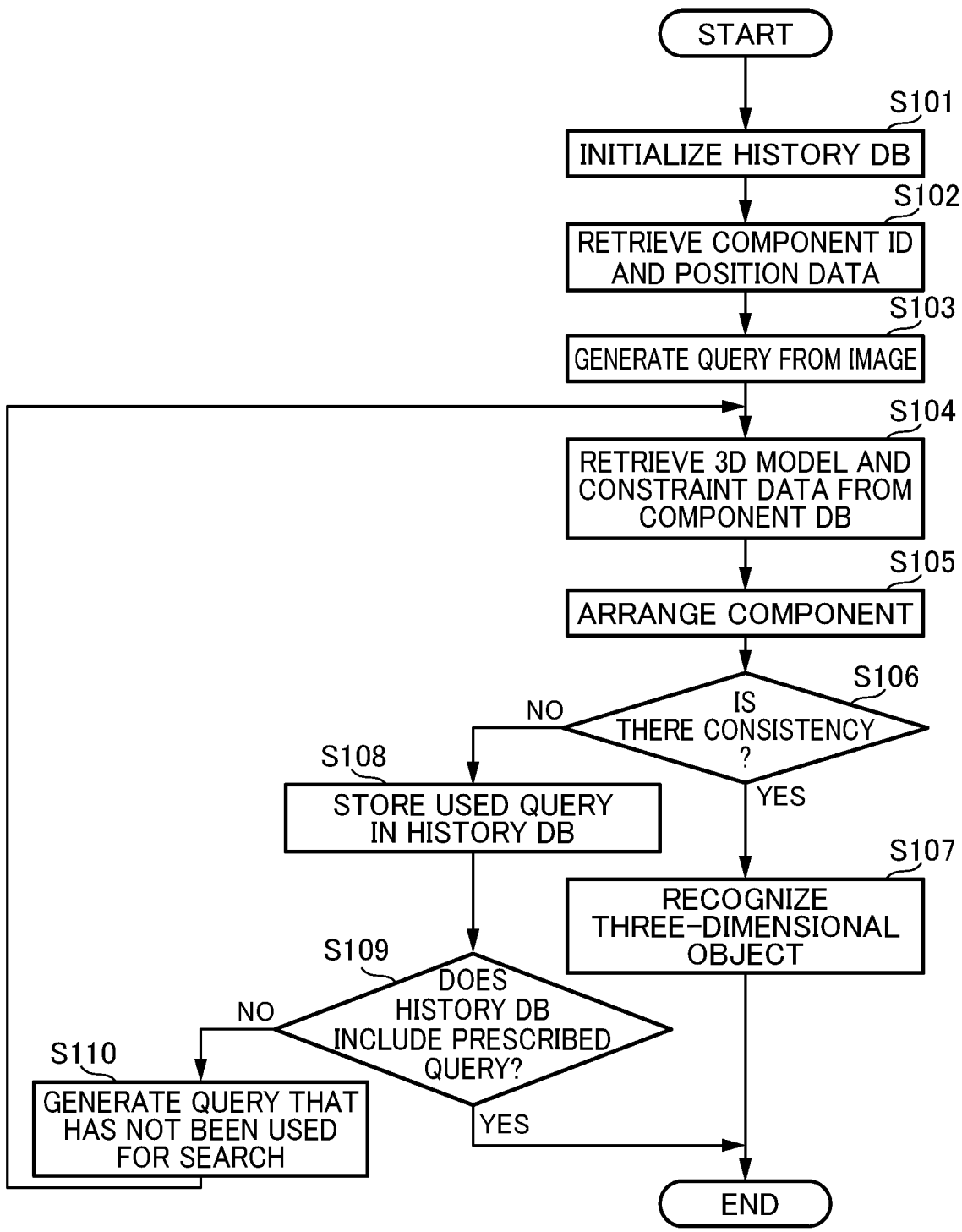
FIG. 10 is a flowchart showing the information processing of the three-dimensional object recognition system according to the embodiment of the present invention.

Next, the information processing of the three-dimensional object recognition system 1 according to the embodiment of the present invention will be described by using a flowchart shown in FIG. 10. The information processing illustrated in FIG. 10 is realized by causing the electronic device 3 to execute a program and causing the server 4 to execute a program. In this example, a query itself is used as query data for storage.

In step 101, the server 4 deletes queries stored in the history database 42 before the electronic device 3 recognizes an image. By doing so, the server 4 initializes the history database 42 and puts the history database 42 into a state in which no query is stored.

Next, in step 102, the image recognition unit 31 extracts, from an image captured by the image capture device 14, markers that allow individual components 5 to be identified, and retrieves, from the extracted markers, component IDs associated with the individual components 5 and the position data of the components 5. In addition, at this time, the image recognition unit 31 recognizes, from image data captured by the image capture device 14, a base part forming a base portion on which a structure is placed.

Next, in step 103, the query generation unit 32 generates a query including the component IDs retrieved in step 102, and position data belonging to the individual component IDs.

Next, in step 104, the data retrieving unit 33 uses the generated query to retrieve, from the component database 41, the three-dimensional models and constraint data of components 5 associated with the individual component IDs included in the query.

Next, in step 105, for each component ID included in the query, the component arrangement unit 34 arranges each component 5 in a virtual space corresponding to a real space by using the position data and the three-dimensional model. In addition, the component arrangement unit 34 arranges the base part in the virtual space. Next, the component arrangement unit 34 individually identifies pairs of components 5 adjacent to each other among the arranged components 5 by determining whether or not the pairs of the arranged components 5 are adjacent to each other. The component arrangement unit 34 selects, in a prescribed order, a pair of components 5 from among the pairs of components 5 determined to be adjacent to each other. For each pair of components 5 determined to be adjacent to each other, the component arrangement unit 34 moves, etc. one of the two components 5 to align the components 5 so as to satisfy joining constraint conditions, and confirms the arrangement.

Next, in step 106, the consistency determination unit 35 determines, on the basis of the positional relationship of the individual components 5 arranged in step 105, the consistency of the positions of the individual arranged components 5, specifically by means of at least one of the following determinations. On the basis of the positional relationship between the positions of the individual arranged components 5 and the position of the base part, the consistency determination unit 35 (a) determines that there is consistency in the case where the individual arranged components 5 are arranged in conformance with gravity, and (b) determines that there is no consistency in the case where the individual arranged components 5 are not arranged in conformance with gravity. In addition, (a) in the case where the degree of overlapping among areas occupied by the three-dimensional models of the individual arranged components 5 is within a prescribed volume, the consistency determination unit 35 determines that there is consistency, and (b) in the case where the degree of overlapping exceeds the prescribed volume, the consistency determination unit 35 determines that there is no consistency. In addition, the consistency determination unit 35 (a) determines that there is consistency in the case where the degree of matching between an image captured by the image capture device 14 and an image, viewed from a virtual camera, of individual components 5 arranged in a virtual space by the component arrangement unit 34 is equal to or more than a default value, and (b) determines that there is no consistency in the case where the degree of matching is less than the default value.

(a) In the case where it is determined that there is consistency in all of the determinations in step 106, this processing proceeds to step 107, the three-dimensional object recognition unit 36 recognizes a structure on the basis of the positions of the individual components 5 arranged in step 105, and this processing ends.

(b) In the case where it is determined that there is no consistency in any of the determinations in step 106, this processing proceeds to step 108. In step 108, the database storage unit 37 stores the query used in step 104 in the history database 42, and this processing proceeds to step 109.

In step 109, the query regeneration determination unit 38 determines whether or not the query stored in the history database 42 includes a prescribed combination of the component IDs of a plurality of individual components 5 stored in the component database 41. In the case where the history database 42 does not include a query including the prescribed combination of component IDs, the query regeneration determination unit 38 determines to regenerate a query, and this processing proceeds to step 110. In the case where the history database 42 includes a query including the prescribed combination of component IDs, the query regeneration determination unit 38 determines not to regenerate a query, and this processing ends. In the case where it is determined not to regenerate a query and this processing ends, the electronic device 3 may output an error to the display device 12, etc.

In step 110, the query regeneration unit 39 generates a query different from a query stored in the history database 42, and this processing proceeds to step 104. In the case where the distance between the three-dimensional models of two components 5 among components 5 arranged in a virtual space by the component arrangement unit 34 is equal to or more than a prescribed value, the query regeneration unit 39 generates a query to which the component ID of a component 5 corresponding to that distance is added.

Next, the effects of the three-dimensional object recognition system 1 according to the embodiment of the present invention will be described. In this embodiment, the target of the three-dimensional object recognition system 1 is a structure formed by assembling components 5 provided in advance, and the three-dimensional object recognition system 1 predefines, for each component 5, the three-dimensional model of the component 5 and joining constraint conditions indicating how the component 5 is to be joined, and stores these items of data in the component database 41. The three-dimensional object recognition system 1 receives, as an input, a captured image captured by using a standard smartphone camera, and individually and independently detects elements (components 5) constituting a structure without directly recognizing a three-dimensional shape from the captured image. The three-dimensional object recognition system 1 generates a query including the component IDs of the individually detected components 5, retrieves data from the component database 41 by using the query, joins the three-dimensional models of the individual components 5 so as to satisfy joining constraint conditions, and arranges the components 5 in a virtual space. The three-dimensional object recognition system 1 evaluates the physical consistency of component arrangement, and repeats searching the component database 41 and alignment until an appropriate arrangement is acquired.

With such a configuration, it becomes possible for the three-dimensional object recognition system 1 in this embodiment to reconstruct the three-dimensional model of an entire structure from a single image, and recognize the three-dimensional shape of the structure. In particular, when recognizing the three-dimensional shape of the structure directly from a single image, it becomes possible to recognize the three-dimensional shape of the entire structure by estimating the space information of components having less outer surface exposure, which cannot be realized by existing three-dimensional shape recognition technologies. Thus, in this embodiment, it becomes possible to provide user operations with simplicity when recognizing a three-dimensional shape from a plane image acquired by capturing an image of a structure, and also provide flexibility when forming the structure.

In addition, with such a configuration, the three-dimensional object recognition system 1 in this embodiment is provided with a function for automatically correcting the positions of components 5 by defining limitations on the joining positions of the components 5 by using joining constraint conditions. This makes it possible to alleviate noise generated in the assembly process or image processing process of components 5, and more stably recognize a structure.

In addition, with such a configuration, because the three-dimensional object recognition system 1 in this embodiment recognizes only known components 5, no machine learning is needed for recognizing the components 5, and thus, it is possible to reduce the computational cost.

In addition, with such a configuration, the three-dimensional object recognition system 1 in this embodiment does not depend on any special sensor and receives, as an input, only an image captured by using a standard smartphone camera. Thus, the three-dimensional object recognition system 1 does not require any special equipment and can be realized inexpensively. In addition, because components 5 may be made of any material with which the shapes of the components as rigid bodies do not change easily, it becomes possible to manufacture the components 5 inexpensively in accordance with the application. For example, the material can be selected appropriately in accordance with application, such as wood for an application in which a strong impact due to throwing or treading is expected, or paper for an application in which the formation of the components 5 is also left to a user.

In addition, in this embodiment, when repeating search and alignment while updating a query, the three-dimensional object recognition system 1 stores the history of queries in the history database 42, thereby preventing the same query from being used for search. With such a configuration, it becomes possible to make the number of query regenerations finite and appropriately stop the processing of the three-dimensional object recognition system 1. In addition, because the history database 42 is used to prevent a search using the same query from being executed, the three-dimensional object recognition system 1 deletes queries stored in the history database 42 before starting structure recognition processing.

In addition, in this embodiment, the three-dimensional object recognition system 1 determines whether or not the distance between the joining reference points 6 of two components 5 arranged first in a virtual space is within a prescribed value, and in the case where the distance is within the prescribed value, determines that the two components 5 are adjacent to each other. With such a configuration, it becomes possible for the three-dimensional object recognition system 1 to align a pair of components 5 that are present within a prescribed distance from each other so as to satisfy joining constraint conditions, and not to align a pair of components 5 that are not present within the prescribed distance from each other so as to satisfy joining constraint conditions. This makes it possible to prevent two components 5 arranged to sandwich a specific component 5 from being aligned so as to satisfy joining constraint conditions in the case where the specific component 5 is not detected from a captured image, thereby reducing the number of inconsistency detections.

In addition, in this embodiment, the marker is an AR marker, which is constituted of, for example, a rectangular black frame and a laterally asymmetrical dot pattern drawn in the frame, and the dot pattern is configured to be different for each component 5. This makes it possible for the three-dimensional object recognition system 1 to use a known image recognition technology to retrieve the position and orientation of a marker from the image capture device 14 on the basis of, for example, the shape and size of a rectangular black frame in an image in which the marker is captured. In addition, it becomes possible for the three-dimensional object recognition system 1 to use a known image recognition technology to identify each component 5 on the basis of, for example, a dot pattern in an image in which a marker is captured.

In addition, in this embodiment, a query includes component IDs and data belonging to the component IDs, and the data belonging to the component IDs include the position data, three-dimensional models, and constraint data of components 5 associated with the component IDs. When a query is generated, the three-dimensional object recognition system 1 uses the query to respectively add, from the component database 41 to the query, in association with the component IDs, the three-dimensional models and constraint data of the components 5 associated with the individual component IDs included in the query. In this way, the three-dimensional object recognition system 1 retrieves the three-dimensional models and constraint data of components 5 from the component database 41. As described above, in this embodiment, the three-dimensional object recognition system 1 uses a query to search the component database 41, to retrieve data from the component database 41, and to store the data in the history database 42. This makes it possible to make the information processing of the three-dimensional object recognition system 1 more efficient.

In addition, in this embodiment, the three-dimensional object recognition system 1 determines the consistency of the positions of individual arranged components 5 on the basis of the degree of overlapping among areas occupied by the three-dimensional models of the individual arranged components 5. In addition, in this embodiment, the three-dimensional object recognition system 1 determines whether or not individual arranged components 5 are arranged in conformance with gravity on the basis of the positional relationship between the positions of the individual arranged components 5 and the position of a base part. In addition, in this embodiment, the three-dimensional object recognition system 1 determines consistency on the basis of the degree of matching between an image captured by the image capture device 14 and an image, viewed from a virtual camera, of individual arranged components 5 arranged in a virtual space by the component arrangement unit 34. With such a configuration, it becomes possible for the three-dimensional object recognition system 1 in this embodiment to evaluate the physical consistency of component arrangement. Thus, it becomes possible for the three-dimensional object recognition system 1 to determine whether or not a recognized structure is appropriate.

In addition, in this embodiment, the three-dimensional object recognition system 1 determines whether or not a query stored in the history database 42 includes a prescribed combination of component IDs stored in the component database 41. In the case where the prescribed combination of component IDs includes a component ID recognized by the image recognition unit 31 with an accuracy equal to or more than a specific value, or a component ID having a priority equal to or more than a specific value, it becomes possible to further limit the type of generated query. This makes it possible to make the information processing of the three-dimensional object recognition system 1 more efficient. In the case where the prescribed combination of component IDs is all combinations, it becomes possible to generate all queries that can be generated on the basis of the component database 41, to make the number of query regenerations finite, and to appropriately stop the processing of the three-dimensional object recognition system 1.

In addition, in this embodiment, in the case where it is determined to regenerate a query, and the distance between the three-dimensional models of two components 5 among components 5 arranged in a virtual space by the component arrangement unit 34 is equal to or more than a prescribed value, the three-dimensional object recognition system 1 generates a query to which the component ID of a component 5 corresponding to that distance is added. With such a configuration, in this embodiment, it becomes possible to make the information processing of the three-dimensional object recognition system 1 more efficient by estimating a component 5 that cannot be recognized from a captured image, and preferentially generating a query to which the component 5 is added.

The above-described effects are also applicable to other embodiments and other examples unless explicitly mentioned otherwise.

In another embodiment of the present invention, it is possible to provide a program that realizes the functions of the embodiment of the present invention or the information processing shown in the flowchart, described above, or to provide a computer-readable storage medium in which the program is stored. In another embodiment, it is possible to provide an electronic device that realizes, by itself, the functions of the embodiment of the present invention or the information processing shown in the flowchart, described above. In another embodiment, it is possible to provide a method for realizing the functions of the embodiment of the present invention or the information processing shown in the flowchart, described above. In another embodiment, it is possible to provide a server capable of providing a computer with a program that realizes the functions of the embodiment of the present invention or the information processing shown in the flowchart, described above. In another embodiment, it is possible to provide a virtual machine that realizes the functions of the embodiment of the present invention or the information processing shown in the flowchart, described above.

Modifications of the embodiment of the present invention will be described below. The modifications described below may be combined as appropriate and applied to any embodiment of the present invention as long as no inconsistency occurs.

In one example, the alignment metadata of a specific component 5 is defined by conditions for a distance and an angle between the joining reference point of another arbitrary component and the joining reference point of the specific component 5, and is data defining constraints on the relationship between the specific component 5 and another arbitrary component 5. In this example, the component database 41 stores one item of alignment metadata defining constraints on the relationship between a specific component 5 and an arbitrary component 5 to be joined to the specific component 5 in association with the component ID of the specific component 5. In this example, the constraint data of a specific component 5 has one item of alignment metadata, and the alignment metadata has a joining reference point 6 and the elements of positional and orientational constraints as data belonging to the joining reference point 6.

In one example, the component arrangement unit 34 determines whether or not the distance between the center points of two components 5 arranged first is within a prescribed value, and in the case where the distance is within the prescribed value, determines that the two components 5 are adjacent to each other. In another example, the component arrangement unit 34 determines whether or not the distance between rigid bodies forming two components 5 arranged first is within a prescribed value, and in the case where the distance is within the prescribed value, determines that the two components 5 are adjacent to each other. In either case, the component arrangement unit 34 selects, in a prescribed order, a pair of components 5 from among pairs of components 5 determined to be adjacent to each other, moves, etc. one of two components 5 for each pair so as to satisfy joining constraint conditions, and confirms an arrangement.

In one example, in step 106, in the case where it is determined that there is no consistency, the consistency determination unit 35 calculates a consistency evaluation value for the positions of individual components 5 arranged by the component arrangement unit 34. In step 108, the database storage unit 37 further stores, in the history database 42, in association with individual component IDs included in query data for storage, the consistency evaluation value for the positions of the individual components 5 arranged by the component arrangement unit 34. In step 109, in the case where the query regeneration determination unit 38 determines not to regenerate a query, in step 105, the electronic device 3 recognizes a structure by means of the three-dimensional models and position data of the individual components 5 arranged in a virtual space by using a query having the highest consistency based on the evaluation value. This makes it possible for the electronic device 3 to recognize the three-dimensional model of the entire structure by using, among arrangements of the individual components 5 determined not to have consistency, an arrangement of the individual components 5 having the highest consistency based on the evaluation value.

In the processing or operation described above, it is possible to freely modify the processing or operation as long as no inconsistency arises in the processing or operation, such as an inconsistency that a specific step involves the use of data that could not yet be available in that step. In addition, the examples described above are examples for explaining the present invention, and the present invention is not limited to the examples. The present invention can be embodied in various forms not departing from the spirit thereof. For example, the appearance or shape of each device is not limited to that in a drawing.

REFERENCE SIGNS LIST

1 Three-dimensional object recognition system
2 Network
3 Electronic device
4 Server
5 Component
6 Joining reference point
11, 21 Processor
12, 22 Display device
13, 23 Input device
14 Image capture device
15, 24 Storage device
16, 25 Communication device
31 Image recognition unit
32 Query generation unit
33 Data retrieving unit
34 Component arrangement unit
35 Consistency determination unit
36 Three-dimensional object recognition unit
37 Database storage unit
38 Query regeneration determination unit
39 Query regeneration unit
41 Component database
42 History database

The invention claimed is:

1. A non-transitory computer readable medium storing a program for recognizing a three-dimensional object present in a real space and constituted of a plurality of predefined components, the program being executed by an electronic device provided with an image capture device for capturing an image of the three-dimensional object, the program causing the electronic device to execute:
   an image recognition step for individually extracting, from an image captured by the image capture device, features that allow individual components to be identified, and retrieving IDs of the individual components and position data of the individual components based on the features;
   a query generation step for generating a first query including the IDs of the individual components retrieved based on the features;
   a data retrieving step for retrieving, in response to the generated query, by using the first query, a plurality of three-dimensional models and constraint data of the individual components associated with the IDs included in the first query, from a component database that stores, in association with each other, the IDs of the individual components, the plurality of three-dimensional models of the individual components, and constraint data indicating joining constraint conditions between the individual components;
   a component arrangement step for arranging the individual components in a virtual space corresponding to the real space based on the position data, the plurality of three-dimensional models, and constraint data retrieved for the individual components to produce individual arranged components;
   a consistency determination step for determining a consistency of positions of the individual arranged components based on a positional relationship between the individual arranged components;
   in response to determining that there is consistency, a three-dimensional object recognition step for recognizing the three-dimensional object based on the positions of the individual arranged components; and
   in response to determining that there is no consistency, a database storage step for storing, in a history database, query data for storage including at least the IDs of the individual components in the first query used in the data retrieving step,
   a query regeneration determination step for determining whether or not to regenerate the first query based on the query data for storage stored in the history database and data stored in the component database, and
   a query regeneration step for generating, in response to determining to regenerate the first query, a second query including data different from the query data for storage stored in the history database.

2. The non-transitory computer readable medium according to claim 1, wherein the program causes the electronic device to execute
   a database initialization step for deleting, before the image recognition step, the query data for storage stored in the history database.

3. The non-transitory computer readable medium according to claim 1, wherein the component arrangement step arranges the individual components in the virtual space by using the position data and the plurality of three-dimensional models retrieved for the individual components, and, for individual components adjacent to each other in the virtual space, aligns and arranges the individual components so as to satisfy the joining constraint conditions.

4. The non-transitory computer readable medium according to claim 3, wherein, based on whether or not a distance between the plurality of three-dimensional models of two individual components among the individual components arranged in the virtual space is within a prescribed value, the component arrangement step determines whether or not the two individual components are adjacent to each other.

5. The non-transitory computer readable medium according to claim 1, wherein the position data comprises a six degrees of freedom position.

6. The non-transitory computer readable medium according to claim 1, wherein the features that allow the individual components to be identified are AR markers that the individual components have on surfaces of the individual components.

7. The non-transitory computer readable medium according to claim 1, wherein, when the first query is generated, the data retrieving step uses the first query to retrieve, from the component database, the plurality of three-dimensional models and constraint data of the individual components associated with the IDs included in the first query, by respectively adding the plurality of three-dimensional models and constraint data to the first query in association with the IDs.

8. The non-transitory computer readable medium according to claim 1, wherein the consistency determination step determines the consistency of the positions of the individual arranged components based on a degree of overlapping among areas occupied by the plurality of three-dimensional models of the individual arranged components.

9. The non-transitory computer readable medium according to claim 1, wherein the image recognition step recognizes a base part forming a base portion of the three-dimensional object from the image captured by the image capture device,
  the component arrangement step arranges the base part in the virtual space, and
  the consistency determination step determines whether or not the individual arranged components are arranged in conformance with gravity based on the positional relationship between the positions of the individual arranged components and a position of the base part.

10. The non-transitory computer readable medium according to claim 1, wherein the consistency determination step determines the consistency based on a degree of matching between the image captured by the image capture device and an image of the individual arranged components viewed from a virtual camera arranged at a position in the virtual space corresponding to a position of the image capture device.

11. The non-transitory computer readable medium according to claim 1, wherein the database storage step further stores, in the history database, in association with the IDs of individual components included in the query data for storage, the positions of the individual arranged components.

12. The non-transitory computer readable medium according to claim 1, wherein the query regeneration determination step determines whether or not to regenerate the first query based on whether or not the query data for storage stored in the history database includes a prescribed combination of the IDs of the individual components stored in the component database.

13. The non-transitory computer readable medium according to claim 1, wherein the program further causes the electronic device to execute
  an error output step for outputting an error in response to determining not to regenerate the first query.

14. The non-transitory computer readable medium according to claim 1, wherein the database storage step further stores, in the history database, in association with the IDs of individual components included in the query data for storage, a consistency evaluation value for the positions of the individual arranged components.

15. The non-transitory computer readable medium according to claim 14, wherein the program further causes the electronic device to execute
  a second three-dimensional object recognition step for recognizing a three-dimensional object based on the positions of the individual arranged components having a highest consistency based on the consistency evaluation value, in response to determining not to regenerate the first query.

16. The non-transitory computer readable medium according to claim 1, wherein the query regeneration step generates the second query to which, in response to a distance between the plurality of three-dimensional models of two individual components among the individual arranged components being arranged in the virtual space is equal to or more than a prescribed value, an ID of a component corresponding to the distance is added.

17. A three-dimensional object recognition system for recognizing a three-dimensional object present in a real space and constituted of a plurality of predefined components, the three-dimensional object recognition system comprising:
  an electronic device provided with an image capture device for capturing an image of the three-dimensional object;
  a component database that stores, in association with each other, IDs of individual components, a plurality of three-dimensional models of the individual components, and constraint data indicating joining constraint conditions between the individual components;
  a history database that stores query data for storage including at least the IDs of the individual components in a query input to the component database;
  an image recognition unit that individually extracts, from an image captured by the image capture device, features that allow the individual components to be identified, and retrieves the IDs of the individual components and position data of the individual components based on the features;
  a query generation unit that generates a first query including the IDs of the individual components retrieved based on the features;
  a data retrieving unit that retrieves, in response to the generated query, by using the first query, the plurality of three-dimensional models and constraint data of the individual components associated with the IDs included in the first query, from the component database;
  a component arrangement unit that arranges the individual components in a virtual space corresponding to the real space based on on the position data, the plurality of three-dimensional models, and constraint data retrieved for the individual components to produce individual arranged components;
  a consistency determination unit that determines a consistency of positions of the individual arranged components based on a positional relationship between the individual arranged components;

a three-dimensional object recognition unit that, in response to determining that there is consistency, recognizes the three-dimensional object based on the positions of the individual arranged components; and a database storage unit that, in response to determining that there is no consistency, stores, in the history database, the query data for storage including at least the IDs of the individual components in the first query used by the data retrieving unit;

a query regeneration determination unit that determines whether or not to regenerate the first query based on the query data for storage stored in the history database and data stored in the component database; and a query regeneration unit that generates, in response to determining to regenerate the first query, a second query including data different from the query data for storage stored in the history database.

18. An electronic device for recognizing a three-dimensional object present in a real space and constituted of a plurality of predefined components, the electronic device comprising:

an image capture device for capturing an image of the three-dimensional object;

a component database that stores, in association with each other, IDs of individual components, a plurality of three-dimensional models of the individual components, and constraint data indicating joining constraint conditions between the individual components;

a history database that stores query data for storage including at least the IDs of the individual components in a query input to the component database;

an image recognition unit that individually extracts, from an image captured by the image capture device, features that allow the individual components to be identified, and retrieves the IDs of the individual components and position data of the individual components based on the features;

a query generation unit that generates a first query including the IDs of the individual components retrieved based on the features;

a data retrieving unit that retrieves, in response to the generated query, by using the first query, the plurality of three-dimensional models and constraint data of the individual components associated with the IDs included in the first query, from the component database;

a component arrangement unit that arranges the individual components in a virtual space corresponding to the real space based on the position data, the plurality of three-dimensional models, and constraint data retrieved for the individual components to produce individual arranged components;

a consistency determination unit that determines a consistency of positions of the individual arranged components based on a positional relationship between the individual arranged components;

a three-dimensional object recognition unit that, in response to determining that there is consistency, recognizes the three-dimensional object based on the positions of the individual arranged components; and a database storage unit that, in response to determining that there is no consistency, stores, in the history database, the query data for storage including at least the IDs of the individual components in the first query used by the data retrieving unit;

a query regeneration determination unit that determines whether or not to regenerate the first query based on the query data for storage stored in the history database and data stored in the component database; and a query regeneration unit that generates, in response to determining to regenerate the first query, a second query including data different from the query data for storage stored in the history database.

19. A method for recognizing a three-dimensional object present in a real space and constituted of a plurality of predefined components, the method being executed by an electronic device provided with an image capture device for capturing an image of the three-dimensional object, the method comprising:

an image recognition step for individually extracting, from an image captured by the image capture device, features that allow individual components to be identified, and retrieving IDs of the individual components and position data of the individual components based on the features;

a query generation step for generating a first query including the IDs of the individual components retrieved based on the features;

a data retrieving step for retrieving, in the case where in response to the generated query, by using the first query, a plurality of three-dimensional models and constraint data of the individual components associated with the IDs included in the first query, from a component database that stores, in association with each other, the IDs of the individual components, the plurality of three-dimensional models of the individual components, and constraint data indicating joining constraint conditions between the individual components;

a component arrangement step for arranging the individual components in a virtual space corresponding to the real space based on the position data, the plurality of three-dimensional models, and constraint data retrieved for the individual components to produce individual arranged components;

a consistency determination step for determining a consistency of positions of the individual arranged components based on a positional relationship between the individual arranged components;

in response to determining that there is consistency, a three-dimensional object recognition step for recognizing the three-dimensional object based on the positions of the individual arranged components; and in response to determining that there is no consistency, a database storage step for storing, in a history database, query data for storage including at least the IDs of the individual components in the first query used in the data retrieving step, a query regeneration determination step for determining whether or not to regenerate the first query based on the query data for storage stored in the history database and data stored in the component database, and a query regeneration step for generating, in response to determining to regenerate the first query, a second query including data different from the query data for storage stored in the history database.

* * * * *